United States Patent Office 3,404,854
Patented Oct. 8, 1968

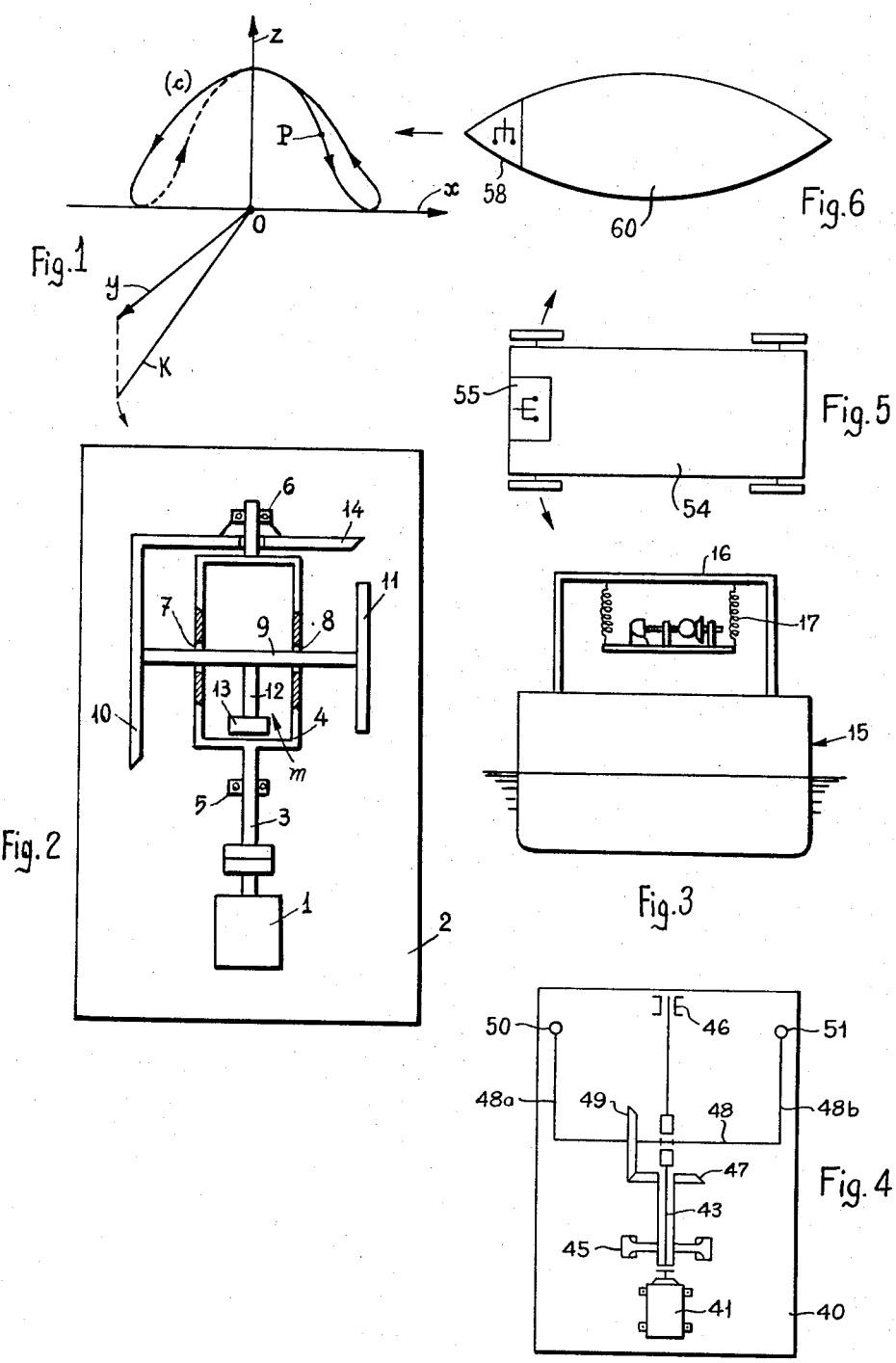

3,404,854
APPARATUS FOR IMPARTING MOTION TO A BODY
Alfio di Bella, Via Montallegro 1, Genoa, Italy
Continuation-in-part of application Ser. No. 524,365, Dec. 23, 1965. This application May 5, 1967, Ser. No. 636,553
Claims priority, application Italy, Aug. 30, 1963, 18,038/63
7 Claims. (Cl. 244—62)

ABSTRACT OF THE DISCLOSURE

Apparatus for propelling a body free to move in a plane unidirectionally along a straight path. A driven mass is guided by guide means for guiding the driven mass in a path of movement defined by a three-dimensional curve and at a speed which varies along the curve. The path of movement is followed by the center of mass of the mass.

---

This application is a continuation-in-part of application Ser. No. 389,375, filed Aug. 13, 1964 and of my application 524,365 filed Dec. 23, 1965, now both abandoned.

This invention relates to apparatus for imparting motion in a preselected direction to a body.

According to the invention, motion in a preselected direction is imparted to a body by mounting a mass on the body for movement relative to the body, driving the mass and guiding the center of mass of the driven mass along a path of movement defined by a closed three-dimensional curve and at a speed which varies along the curve. It is found that such motion of the mass imparts motion to the body in a direction preselected by selecting the orientation of the curve relative to the body. An apparatus according to the invention comprises drive means operatively connected to the mass for driving the mass, the drive means being adapted to be fixedly mounted relative to the body, and guide means for guiding the driven mass in a path of movement defined by a closed three-dimensional curve and at a speed which varies along the curve, the path of movement being followed by the center of mass of the mass.

According to a specific embodiment of the invention, motion is imparted to the body in a preselected direction by rotating the mass about a first axis at a varying distance from the center of the mass to the first axis, and simultaneously rotating the first axis about a second axis, the second axis being athwart the first axis and the first and second axes being operatively connected to the body.

A specific embodiment of the apparatus for carrying out the method of the invention comprises a support frame adapted to be fixedly attached to the body, a first shaft, means for mounting the first shaft on the support frame for rotation about its axis, a second shaft positioned with its axis athwart the axis of the first shaft and interconnected with the first shaft for simultaneous rotation of both shafts about their respective axes and a mass carried by the second shaft at a fixed distance from the axis of the second shaft. This apparatus carries out the method of the invention as described above when the shafts are rotated.

The motion that it is desired to impart to the body is motion in a definable direction which may be preselected each time. Thus, for example, the apparatus of the invention may be attached to the top of a rectangular platform provided at each of its corners with a foot member, in which instance the platform with its foot members is the body. The platform or foot members are not attached to the floor or other fixed support surface upon which the platform rests on its foot members. It is found that the vibration imparted to this body by the operation of the apparatus of the invention causes the body carrying the apparatus to undergo translational motion across the support surface by a walklike shifting of weight upon its foot members. Also, the apparatus may be mounted in or on a water vessel, i.e., a boat or a ship, and the operation of the apparatus will impart a net translational motion to the water vessel, moving it through the water. Furthermore, the apparatus may be attached to lighter-then-air vehicles and the operation of the apparatus will impart a net translational motion to the lighter-than-air vehicle, moving it through the air. Typically, the lighter-than-air vehicle is a lightweight shell, balloon or bag filled with hydrogen gas or helium gas. Commonly known lighter-than-air vehicles which may be propelled by means of the apparatus and method of the invention are blimps, dirigibles and balloons.

The invention will now be further described by reference to the drawings, in which:

FIG. 1 is a graphical representation of the path described by the point P defining the center of mass of a mass carried by a shaft, having a longitudinal axis K, at a fixed distance from the point P to the axis K, the shaft rotating about another axis $x$ while the mass rotates about the first mentioned shaft according to the invention;

FIG. 2 is a plan view of a specific embodiment of an apparatus according to the invention;

FIG. 3 is an end elevation view of a boat, floating in water, and on which is mounted the apparatus of FIG. 2;

FIG. 4 is a plan view of a diagrammatic illustration of a second embodiment of apparatus according to the invention;

FIG. 5 is a plan view of a vehicle provided with apparatus according to FIG. 4; and FIG. 6 is a plan view of a lighter-than-air craft provided with apparatus according to FIG. 4.

According to the invention, a mass having its center of mass at the point P is carried by a rotatable shaft, which rotates about its axis K, and as the shaft rotates about its axis K it also rotates about another axis $x$, the axis $x$ being transverse of, i.e., not parallel to, the axis K. This system may be superimposed on a system of coordinates having a horizontal axis $x$, a vertical axis $z$ and a third axis $y$ at right angles to both axes $x$ and $z$ and having an origin O. In the particular system illustrated in FIG. 1, the shaft rotates about its axis K and the shaft with the axis K rotates about another axis which is coincident with the axis $x$ of the coordinate system and accordingly is designated $x$. As the shaft rotates about axes K and $x$, carrying the mass with it, the point P defining the center of mass of the mass moves in a path $c$, the path defining a configuration known to mathematicians as a "Viviani window."

In a specific embodiment of an apparatus which will cause a mass to define a path as shown in FIG. 1, on a rotatable shaft 9 is fixedly mounted an arm 12 to the free end of which is fixedly attached a weight 13. The arm 12 and the weight 13 together define a mass $m$. A frame 4 is mounted on base plate 2 and is provided with bores 7 and 8 through which the shaft 9 passes and which act as bearings for the rotation of the shaft 9.

A motor 1, which may be battery-powered for example, rotates a shaft 3 upon which is mounted, for rotation with the shaft, the frame 4. The shaft 3, which continues on the other side of frame 4, is rotatably mounted on bearings 5 and 6, bearings 5 and 6 being mounted on the base plate 2.

At one end of the shaft 9 is mounted a gear 10 and at the other end of the shaft 9 is mounted a balance weight 11, in the configuration of a disc, to balance the gear 10. On the base plate 2 near the free end of the shaft 3 is fixedly mounted the gear 14, which meshes with the gear 10.

When the motor 1 rotates the shaft 3, the frame 4, being attached to the shaft 3, rotates with the shaft 3. The frame 4 carries with it in rotation about the axis of the shaft 3 the shaft 9. The meshing of the gear 10 with the gear 14 causes the shaft 9 to rotate about its own axis as it rotates about the axis of the shaft 3. Thereby, as the shaft 9 is rotated about the axis of the shaft 3, the mass $m$ is rotated about the axis of the shaft 9 at a fixed distance from the axis of the shaft 9 since it is fixedly mounted on the shaft 9.

As shown in FIG. 2, the mass $m$ is symmetrically disposed relative to the axis of the shaft 3. However, according to another embodiment of the invention the mass $m$ may be disposed to the left or to the right of the axis of the shaft 3. According to still another embodiment of the invention, the mass $m$, rather than being in effect a single integral unit, may be a plurality of discrete units. Thus, for example, rather than a single arm and weight there may be provided mounted on a shaft 9, axially spaced, a pair of parallel arms and weights. In this latter embodiment the center of mass of the mass jointly defined by the two arms and corresponding weights will be a point in space but this is of no consequence with respect to the operation of the invention.

There are numerous other embodiments for effecting the principle of this invention. Thus, for example, two or more of the apparatuses, each having its own support frame, may be coupled together for simultaneous operation. According to still a further embodiment, the direction of rotation of the driven shaft may be reversed at short intervals. Furthermore, the gears may have different numbers of teeth so that the shafts rotate at different speeds. Also, if a plurality of masses on a plurality of shafts are used, each mass may be disposed at a distance from the axis of the shaft about which it rotates different from the corresponding distance of the other masses from their respective shaft axes. Also, even if only a single shaft carrying a mass is used, if the mass consists of a plurality of discrete mass units the mass units may be disposed in different directions and at different distances from the axis of the shaft on which they are carried provided that the resultant center of mass does not lie on the axis of the carrying shaft.

In FIG. 3 the apparatus of FIG. 2 is mounted on a boat 15 by means of a superstructure 16 from which the apparatus of FIG. 2 is suspended by means of springs 17. Operation of the apparatus produces vibrations which move the boat through the water with a net translational motion.

An illustration of the use of two masses is illustrated in FIG. 4 in which a base 40 has a motor 41 driving a shaft 43 mounted on bearings or supports 45, 46 for rotation. A gear 47 is driven from the shaft which in turn drives a second shaft 48 about its axis through another gear 49. The shaft 48 is thus driven about its axis and is at the same time rotated about the axis by the driven shaft 43. The shaft 48 has two arms 48a, 48b of equal length normal to its axis and equally spaced from the axis of the motor driven shaft 43. Two similar masses 50, 51 are fixed to the two arms 48a, 48b and move along paths spaced from the two shafts.

This type of apparatus is usable on vehicles as illustrated in FIG. 5 in which a vehicle 54 is shown provided with an apparatus 55 of the type of FIG. 4 and illustrated diagrammatically. The apparatus is shiftable in position for developing lateral displacements during parking. A device 58 of the type shown in FIG. 4 is shown appplied to a lighter-than-air vehicle 60 for propelling it.

A vehicle being translationally moved by the apparatus of the invention may be braked by reversing the orientation of the axes and rotating mass or masses to a mirror image or by reversing the direction of the motor. The orientation may be reversed to a mirror image of itself simply by rotating the apparatus 180° in the plane of the base plate. Similarly, directional changes of the motion of the vehicle may be made by rotating the apparatus to intermediate positions. Thus, the apparatus may be pivotally mounted on the vehicle (body) to which translational motion is to be imparted and the orientation of the apparatus may sequentially be adjusted to different positions and locked in turn in each desired position so that the vehicle sequentially moves in different desired directions according to the orientation of the apparatus with respect to the vehicle.

The invention is not to be construed as limited to the particular forms disclosed herein, since these are to be regarded as illustrative rather than restrictive.

What I claim and desire to secure by Letters Patent is:

1. In combination with a body free to move in a plane, apparatus for propelling the body unidirectionally along a straight path comprising drive means operatively connected to a mass for driving said mass, said drive means being fixedly mounted relative to said body, and guide means for guiding said driven mass in a path of movement defined by a closed three-dimensional curve and at a speed which varies along said curve, said path of movement thereby being followed by the center of mass of said mass.

2. In combination with a body free to move in a plane, apparatus for propelling the body unidirectionally along a straight path comprising a support frame fixedly attached to said body, a first shaft, means for mounting said first shaft on said support frame for rotation about its axis, a second shaft positioned with its axis athwart the axis of the first shaft and interconnected with the first shaft for simultaneous rotation of both shafts about their respective axes, a mass carried by said first shaft at a fixed distance from the axis of said first shaft, whereby upon rotation of said shafts, the mass rotates about the axis of the first shaft at a fixed distance from the center of said mass to the axis of the first shaft and simultaneously the axis of the first shaft rotates about the axis of the second shaft, the movement of said mass imparting motion to the body when said support frame is fixedly attached to the body.

3. The apparatus of claim 2, wherein said mass comprises a plurality of discrete units.

4. The apparatus of claim 2, wherein said shafts are arranged at right angles with respect to each other.

5. The apparatus according to claim 2, in which the body free to move in a plane is adapted to be supported by the ground whereby the body is propelled unidirectionally along a straight path on the ground.

6. The apparatus according to claim 2, in which the body free to move in a plane is adapted to be supported by water, whereby the body is propelled unidirectionally along a straight path in the water.

7. Apparatus according to claim 2, in which the body free to move in a plane is adapted to be supported by the atmosphere, whereby the body is propelled unidirectionally along a straight path in the atmosphere.

References Cited

FOREIGN PATENTS 1,063,784  12/1953  France.

MILTON KAUFMAN, *Primary Examiner.*